US006768634B2

(12) United States Patent
Kim

(10) Patent No.: US 6,768,634 B2
(45) Date of Patent: Jul. 27, 2004

(54) MOBILE DEVICES HAVING A MIRROR

(76) Inventor: Kwangjun Kim, 5195 Sky Ridge Dr., Glendale, CA (US) 91214

( * ) Notice: Subject to any disclaimer, the term of this patent is extended or adjusted under 35 U.S.C. 154(b) by 0 days.

(21) Appl. No.: 10/330,690

(22) Filed: Dec. 27, 2002

(65) Prior Publication Data

US 2003/0147208 A1 Aug. 7, 2003

Related U.S. Application Data

(60) Provisional application No. 60/344,414, filed on Dec. 28, 2001.

(51) Int. Cl.$^7$ ................................................. H04B 1/38
(52) U.S. Cl. .................. 361/679; 361/683; 455/90; 455/566; 359/265
(58) Field of Search ................................. 361/679, 681, 361/683; 455/90, 566, 575, 550; 379/428.01, 428.02, 433.01, 433.1, 433.11; 206/581, 235; 132/314, 315, 316; 359/265, 267, 275, 322, 320, 589, 340, 468

(56) References Cited

U.S. PATENT DOCUMENTS 6,311,077 B1 * 10/2001 Bien ........................... 455/566

6,424,823 B1 * 7/2002 Moles ......................... 455/90.1

FOREIGN PATENT DOCUMENTS

| JP | 410207392 A | * | 8/1998 | ............. G09F/9/00 |
| JP | 02000004935 A | * | 1/2000 | .......... A45D/42/00 |
| JP | 02001119159 A | * | 4/2001 | ............ H05K/5/02 |

* cited by examiner

*Primary Examiner*—Michael Datskovsky

(57) ABSTRACT

The present invention provides a combined system of mirror and mobile computer or communication device. In one embodiment of the invention, a portable computer comprises a top unit comprising a visual display and a base unit comprising a plurality of key buttons, a mouse, and other peripheral devices. The base unit is coupled to the top unit, and the top unit has a mirror attached to its exterior surface. The top unit may comprise a recess area or pocket on its exterior surface to hold a mirror in place and may comprise a cover or lid to protect the mirror. The mirror may be also disengageably attached to the top unit of the computer using a detachable mechanism. In another embodiment of the invention, the mirror is installed on the base unit of the portable computer so that the mirror is exposed and available for use when a user opens the computer, and covered when the user closes the computer.

10 Claims, 3 Drawing Sheets

MOBILE DEVICES HAVING A MIRROR

This application claims the benefit of U.S. Provisional Application No. 60/344,414, filed Dec. 28, 2001, entitled "Mobile Devices Having a Mirror."

FIELD OF THE INVENTION

This invention relates generally to mobile and portable computer and communication devices. More specifically, the invention relates to a combined system of mirror and computer or communication device.

BACKGROUND OF THE INVENTION

A variety of mobile computers and communication devices have been introduced into the market and made available to the consumers. Such mobile computers include, for example, notebook computers, laptop computers, and now PDAs (personal digital assistants), and cellular phones. Mobile computers these days have become an essential part of users' daily lives and the trend is likely to continue as the power and convenience of the computers continue to increase while the size of the computers become smaller and thus more portable.

Most mobile computers, however, fail to accommodate certain needs and desires, in both appearances and functionality, of some segment of population, for example, teen-agers. Particularly, mobile computer manufacturers to date have failed to appreciate the fact that users, especially teenage girls, may spend a large portion of their time carrying the computers, using the computers, or just have their computers nearby around them for a variety of reasons.

For some people, especially women, mirrors are an indispensable part of daily lives. Mirrors are important as they provide means to groom and maintain users' appearances and looks. Yet, prior art computers and mirrors have failed to combine their functions and serve little functions outside their original intended purposes. Computers and mirrors exist as separate and distinct entities and they serve separate, distinct functions.

SUMMARY OF THE INVENTION

The present invention provides a combined system of mirror and mobile computer or communication device. Unlike prior art systems, the invention provides capability to integrate a mirror and a mobile or portable electronic/optical device. In one embodiment of the invention, a portable computer comprises a top unit comprising a visual display and a base unit comprising a plurality of key buttons, a mouse, and other peripheral devices. The base unit is coupled to the top unit, and the top unit has a mirror attached to its exterior surface. The top unit may comprise a recess area or pocket on its exterior surface to hold a mirror in place and may comprise a cover or lid to protect the mirror. The mirror may be also disengageably attached to the top unit of the computer using detachable mechanisms. The mirror may be located centrally on the exterior surface of the top unit or on its corner.

In another embodiment of the invention, the mirror is installed on the base unit of the portable computer so that the mirror is exposed and available for use when a user opens the computer, and covered when the user closes the computer.

DETAILED DESCRIPTION OF A PREFERRED EMBODIMENT

The invention is particularly applicable to mobile or portable computing or communication devices, and it is in this context that the invention will be described. It will be appreciated, however, that the present invention has greater utility, such as to other types of portable electronic and optical devices. To understand the invention, basic structures of the implementation will be described.

Figure 1:
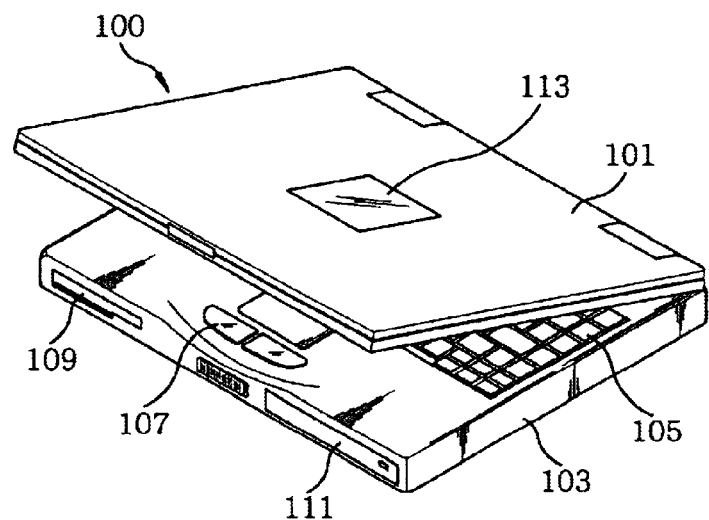
FIG. 1 illustrates a mirror mounted on an exterior face of a mobile computer 100 in accordance with one embodiment of the invention.

FIG. 1. illustrates a mirror mounted on an exterior side of a mobile computer 100. The mobile computer may be a laptop, notebook, or other similar apparatus having two parts of top unit 101 and base unit 103. The top unit has an exterior side and an inner side. The inner side may comprise a display screen and is hidden from view when the computer 100 is closed. Unlike prior art computers, the computer 100 integrates a mirror 113 by attaching the mirror to its top unit 101 so that a user may use the mirror for makeup or other purposes without a need for a separate mirror or similar gear. Unlike prior art systems, the present invention eliminates the need to carry a separate mirror or separate gear to attach or mount a mirror. Using the invention, the user does not have to carry a mirror and a computer separately to satisfy the user's needs.

In FIG. 1, the top unit 101 may contain a monitor screen on the inner face of the unit. The base unit 103 may have key buttons 105, pointing device (mouse) 107, floppy disk drive 109, and a CD-ROM drive 111. The base unit 103 may have other additional parts such as a modem or may not have all parts shown in FIG. 1. In FIG. 1, the mirror 113 may be integrated with the top unit 101 by gluing or molding it to the top unit 101. A pocket or a recess area for holding the mirror may be formed on the surface of the top unit 101 to hold the mirror 113. The mirror 113 may be disengageably mounted to the top unit 101 so that the mirror may be disengaged from the computer. For example, the mirror 113 may be attached to the top unit 101 using a Velcro based mechanism or other suitable method so that the user may take the mirror off the computer 100 and detach it from the computer 100.

The shape of the mirror 113 may be square, rectangular, diamond-shaped, heart-shaped, circular, oval, or assume other suitable shapes. Also, the mirror 113 may be equipped with a protective lid or cover in an alternate embodiment of the invention. For example, a plastic cover may be provided as a cover, or a lid for, the mirror 113. Such cover may be attached to the unit 101 using a hinge, a Velcro mechanism or other suitable method.

The mirror 113 may be mounted on the face of the top unit 101. For example, the mirror 113 may be mounted in the center of the exterior face of the top unit 101 as shown in FIG. 1. It will he appreciated that the mirror 113 may be located anywhere on the surface of the top unit 101. For example, the mirror 113 may be located in any of the four corners of the face of the top unit 101. It is also possible that more than one mirror may be installed on the top unit 101.

A separate compartment for holding makeup items may also be formed on the outside face of the top unit 101, alone or in combination with the mirror 113. For example, a pocket may be formed on the face of the top unit 101 to provide space to hold and store makeup items such as lipsticks and eyelashes. Such pocket may formed underneath the mirror 113 or at other locations on the surface of the top unit 101 separate from the mirror 113.

Figure 2:
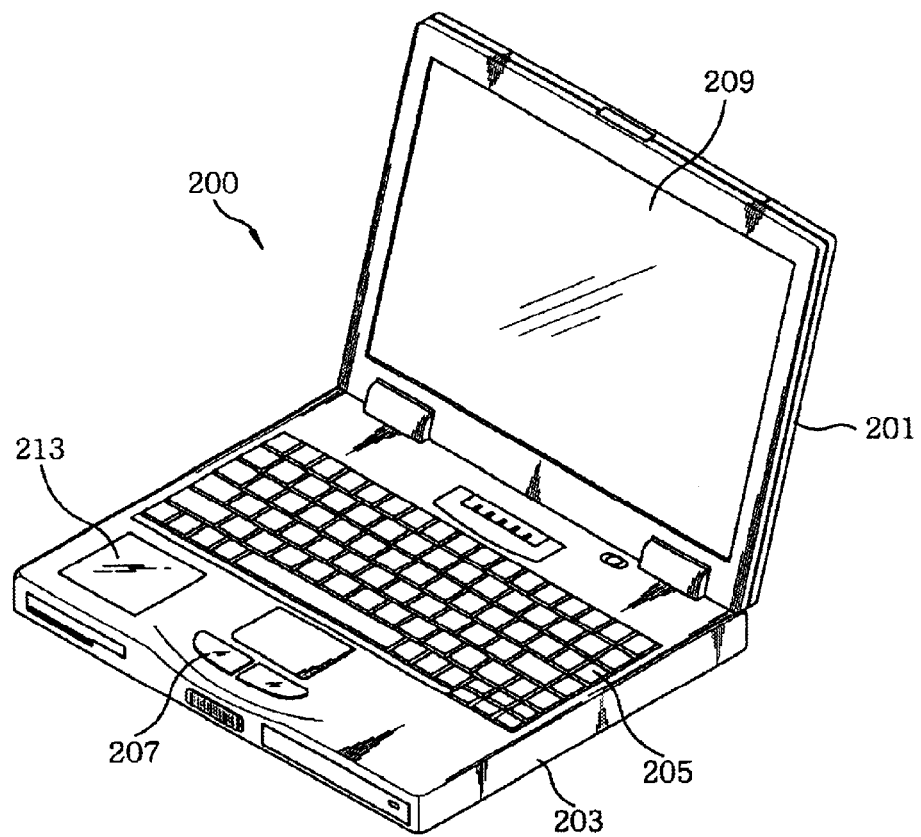
FIG. 2 illustrates a computer 200 having a mirror 213 attached to the base unit 203 in accordance with an alternate embodiment of the invention.

FIG. 2 illustrates a computer 200 having a mirror 213 attached to the inner surface of the base unit 203 in accordance with an alternate embodiment of the invention. The computer 200 has a top unit 201 and a base unit 203. The top unit 201 has a display screen 209 that provides graphical user interface to users. The base unit 203 may have key buttons 205 and pointing device (mouse) 207.

The mirror 213 may be attached or mounted to the base unit 203 using a variety of methods as discussed above. The mirror 213 may assume a variety of shapes and may be located in different locations of the base unit 203. For example, the mirror 213 may be located at a right lower corner of the base unit 203, or other suitable locations. The configuration shown in FIG. 2 has an advantage because the mirror 213 is protected from external damages when the top unit 201 is closed on the base unit 203.

The mirror 213 may be integrated with the base unit 203 by gluing or molding it to the base unit 203. A pocket or a recess area for holding the mirror may be formed on the surface of the base unit 203 to hold the mirror 213. The mirror 213 may be disengageably mounted to the base unit 203 so that the mirror may be disengaged from the computer.

The mirror 213 may be equipped with a lid or cover in an alternate embodiment of the invention. For example, a plastic cover may be provided as a protective cover, or a lid for, the mirror 213. Such cover may be attached to the unit 203 using a hinge, a Velcro mechanism or other suitable method. It is also possible that more than one mirror may be installed on the base unit 203.

A separate compartment for holding makeup items may also be formed on the base unit 203, alone or in combination with the mirror 213. For example, a pocket may be formed on the face of the base unit 203 to provide space to hold and store makeup items such as lipsticks and eyelashes. Such pocket may formed underneath the mirror 213 or at other locations on the base unit 203 separate from the mirror 213.

Figure 3:
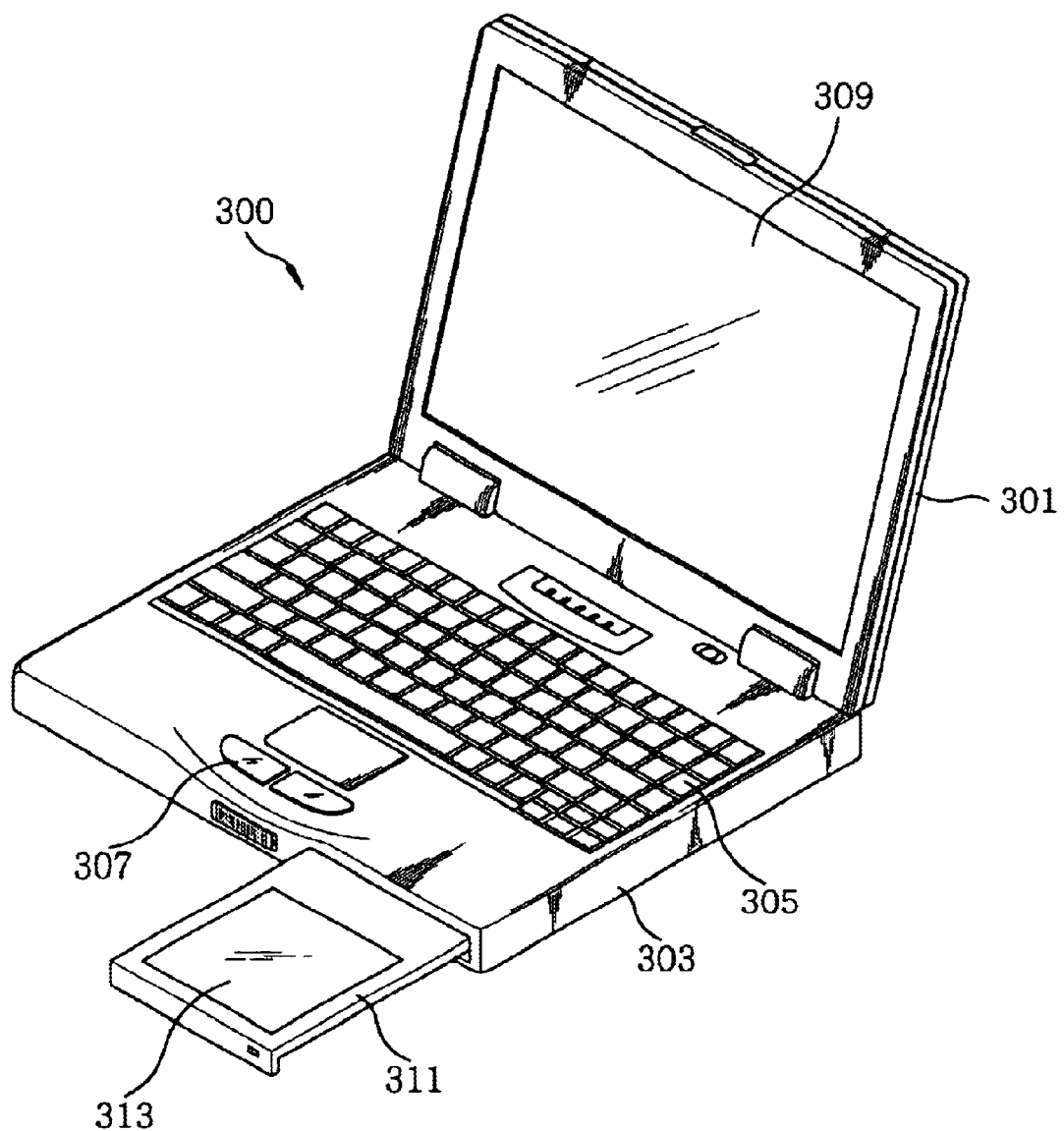
FIG. 3 illustrates a computer 300 having a top unit 301 and a base unit 303 in an alternate embodiment of the invention.

In an alternate embodiment of the invention, a separate sheet may be used to attach or hold a mirror. FIG. 3 illustrates a computer 300 having a top unit 301 and a base unit 303 in an alternate embodiment of the invention. The top unit 301 may have a display screen 309 on its inner side that provides graphical user interface. The bottom unit 303 may have key buttons 305, pointing device (mouse) 307, a sheet or plate 311 for holding a mirror 313.

In one embodiment of the invention, the sheet or plate 31 1 may be a pullout sheet or plate and the base unit 303 may have a slot or pocket inside the base unit 311 to hold the plate 311. Normally, the plate 311 may rest inside the slot, hidden from the user. When the user wants to use the mirror 313, the user may pull out the sheet 311 from the slot in the base unit 303, and the user can retract the plate 311 into the slot when the user is finished with mirror 313. The sheet or plate 311 may be made of a variety of materials including plastic and metal.

In an alternate embodiment of the invention, a slot or pocket for holding the plate 311 may be formed inside the top unit 301 so that the user may pull out the mirror 313 from the top unit 301.

In another embodiment of the invention, the plate 311 may be mounted on the base unit 303 as a flip-out or flip-open plate. In this embodiment of the invention, the plate 311 may be coupled to the base unit 303 using a hinge, a connector or a similar device on the side of the base unit 303 so that the user may flip the plate open and close without using a slot or pocket inside the base unit 303. Alternatively, the hinge or connector may be coupled to the side of the top unit 301 so that the user may flip open and close the mirror 313. In this alternate embodiment, the mirror may flip open out or in so that the mirror may partially block the display screen 309 in its open or closed positions. The hinge or connector may be placed on the top unit 301 so that the mirror rests on the exterior surface or inner surface of the top unit 301. If the mirror is two-sided, the mirror will be open for viewing from either positions.

The mirror 313 may be equipped with a protective lid or cover in an alternate embodiment of the invention. For example, a plastic cover may be provided as a cover, or a lid for, the mirror 313. Such cover may be attached to the plate 311 using a hinge, a Velcro mechanism or other suitable method. It is also possible that more than one mirror may be installed on the sheet 311.

The mirror 313 may be attached or mounted to the plate 311 using a variety of methods as discussed above. The mirror 313 may be provided in a variety of shapes including square, rectangular, diamond-shaped, heart-shaped, circular, or oval.

Figure 4:
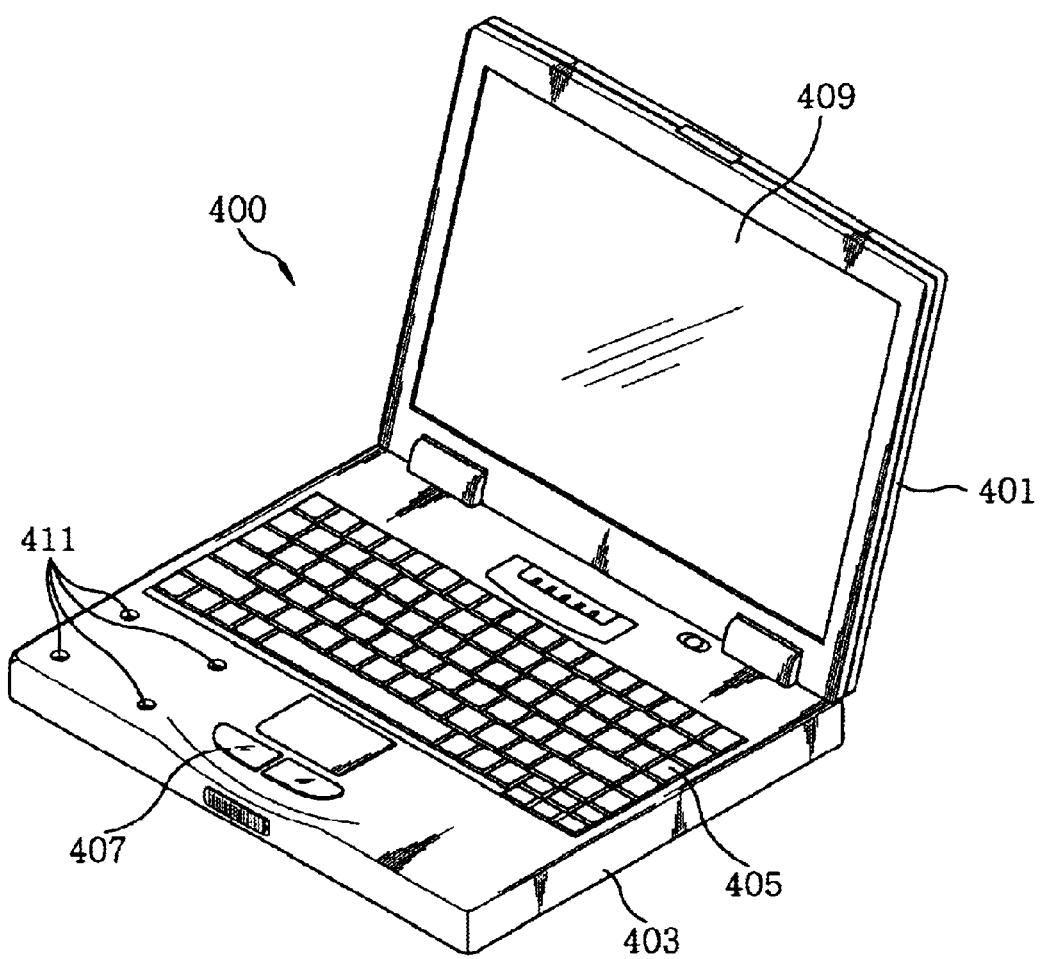
FIG. 4 illustrates a computer 400 having a top unit 401 and a base unit 403 comprising holes 411 for mounting a mirror in an alternate embodiment of the invention.

In yet another embodiment of the invention, the base unit 303 may have holes or slits cut on its surface to hold or mount the plate on the unit 303. FIG. 4 illustrates a computer 400 having a top unit 401 and a base unit 403 comprising holes 411 for mounting a mirror. The top unit 401 may have a display screen 409 that provides graphical user interface. The bottom unit 403 may have key buttons 405, pointing device (mouse) 407, and holes 411. The mirror may have bumps on its face matching the holes 411 so that the user may mount the mirror onto the base unit 403 by fitting the mirror bumps into the holes 411. Although four (4) holes are shown in FIG. 4, it will be appreciated that there may fewer or more holes. In an alternate embodiment of the invention, the base unit 403 may have a slit, alone or in combination with holes 411, for mounting a mirror. In this embodiment, the mirror may be erected at an angle from the surface of the base unit 403 using a support stick or bar resting behind the mirror on the base unit 403 so that the user may adjust the viewing angle. Such support stick or bar may use resting recesses carved on the base unit 403. Other suitable methods may also be used to adjust the viewing angle of the mirror resting on the base unit 403. For example, a spring or latch based mechanism may be used to maintain the viewing angle of the mirror. A push button may be implemented in the base unit 403 so that when the push button is pressed, the spring may be released erect the mirror at an angle or upright and the latch may be activated to hold the mirror at a certain angle from the base unit surface. Such spring based mechanism may be implemented inside or on the surface of the base unit 403 and are generally well-known in the art.

The foregoing description, for purposes of explanation, used specific nomenclature to provide a thorough understanding of the invention. However, it will be apparent to one skilled in the art that the specific details are not required in order to practice the invention. In other instances, well known structures and devices are shown without details in order to avoid unnecessary distraction from the underlying invention. Thus the foregoing descriptions of specific embodiments of the present invention are presented for purposes of illustration description. They are not intended to be exhaustive or to limit the invention to the precise forms disclosed. It will be appreciated by those skilled in the art that changes in this embodiment may be made without departing from the principles and spirit of the invention.

What is claimed is:

1. A portable computing device comprising:

a top unit comprising a visual display;

a base unit comprising a plurality of key buttons, said base unit coupled to said top unit;

wherein said top unit comprises a mirror on its surface, said mirror is placed on an exterior surface of said top unit, and said top unit comprises a recess area on said exterior surface to hold said mirror.

2. The portable computing device of claim 1 wherein said mirror is rectangular-shaped.

3. The portable computing device of claim 1 wherein said mirror is oval-shaped.

4. The portable computing device of claim 1 wherein said top unit comprises a protective cover for said mirror.

5. A portable computing device comprising:

a top unit comprising a visual display;

a base unit comprising a plurality of key buttons, said base unit coupled to said top unit, wherein said base unit comprises a mirror on its inner surface and said mirror is disengageably attached to said inner surface of said base unit.

6. A portable computing device comprising:

a top unit comprising a visual display;

a base unit comprising a plurality of key buttons, said base unit coupled to said top unit, wherein said base unit comprises a mirror on its inner surface and comprises a recess area on said inner surface to hold said mirror, wherein said mirror is oval-shaped.

7. A portable computing device comprising:

a top unit comprising a visual display;

a base unit comprising a plurality of key buttons, said base unit coupled to said top unit;

wherein said top unit has a mirror attached to its exterior surface and comprises a recess area on said exterior surface to hold said mirror in place.

8. The portable computing device of claim 7 wherein said mirror is centrally located on said exterior surface of said top unit.

9. The portable computing device of claim 7 wherein said mirror is located on a corner of said exterior surface of said top unit.

10. The portable computing device of claim 7 wherein said top unit comprises a protective cover for said mirror.

* * * * *